United States Patent Office 3,189,601
Patented June 15, 1965

3,189,601
N,N-ALKYLENE-IMINO-LOWER ALKANO-AMIDINE COMPOUNDS
Robert Paul Mull, Florham Park, N.J., assignor to Ciba Corporation, New York, N.Y., a corporation of Delaware
No Drawing. Filed Jan. 10, 1964, Ser. No. 336,881
8 Claims. (Cl. 260—239)

This is a continuation-in-part application of my application Serial No. 110,884, filed May 18, 1961.

The present invention concerns amidines. More especially, it relates to R-lower alkano-amidines, in which R represents N,N-alkylene-imino, in which alkylene has from three to ten carbon atoms as chain members.

An N,N-alkylene-imino radical, in which alkylene has from three to ten, preferably from five to eight, carbon atoms, may be represented, for example, by N,N-trimethyleneimino (or 1-azetidinyl), N,N-tetramethyleneimino (or 1-pyrrolidino), N,N-pentamethyleneimino (or 1-piperidino), N,N-hexamethyleneimino (or 1-hexahydroazepino), N,N-heptamethyleneimino (or 1-octahydroazocino), N,N-octamethyleneimino (or 1-octahydroazonino), N,N-nonamethyleneimino (or 1-decahydroazecino), N,N-decamethyleneimino and the like.

The carbon atoms of an N,N-alkylene-imino, an N,N-(N-$R_1$-aza-alkylene)-imino, an N,N-bicycloalkylene-imino, or an N,N-(N-$R_1$-aza-bicycloalkylene)-imino radical may be substituted by aliphatic radicals, such as lower alkyl, particularly methyl, as well as ethyl, n-propyl, isopropyl and the like.

The lower alkylene radical, linking R with the amidino group, is represented by lower alkylene having from one to seven carbon atoms. Preferably, lower alkylene has from two to three carbon atoms, which separate the group R from the amidino group by the same number of carbon atoms; such radicals are 1,2-ethylene, 1-methyl-1,2-ethylene, 2-methyl-1,2-ethylene or 1,3-propylene. Other lower alkylene radicals are, for example, methylene, 1,1-ethylene, 2,3-butylene, 1,3-butylene, 1,4-butylene, 1,4-pentylene, 1,5-pentylene and the like.

The amidino group may be represented by the formula

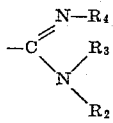

in which each of the radicals $R_2$, $R_3$ and $R_4$ stands primarily for hydrogen. They may also represent organic radicals, such as aliphatic radicals, particularly lower alkyl, e.g., methyl, ethyl, n-propyl, isopropyl and the like. Each of the radicals $R_2$ and $R_4$ may also be the acyl radical of an organic carboxylic acid; such acyl radical represents, for example, the acyl radical of a lower aliphatic carboxylic acid, for example, a lower alkanoic acid, e.g., acetic, propionic, pivalic acid and the like, a substituted lower alkanoic acid, e.g., chloroacetic, dichloroacetic, hydroxyacetic, methoxyacetic, 3-cyclopentylpropionic acid and the like, or a lower alkenoic acid, e.g., 3-butenoic acid and the like, a carbocyclic aryl carboxylic acid, for example, a monocyclic carbocyclic aryl carboxylic acid, e.g., benzoic, 2-hydroxy-benzoic, 4-methoxy-benzoic, 3,4-dimethoxy-benzoic, 3,4,5-trimethoxy-benzoic, 4-O-ethoxycarbonyl-syringic, 3,4-dichlorobenzoic, 3-N,N-dimethyl-amino-benzoic, 4-nitrobenzoic acid and the like, or a bicyclic carbocyclic aryl carboxylic acid, e.g., 1-naphthoic, 2-naphthoic acid and the like, or a heterocyclic aryl carboxylic acid, for example, a monocyclic heterocyclic aryl carboxylic acid, e.g., nicotinic, isonicotinic, 2-furoic acid and the like.

Salts of the new compounds of this invention are particularly pharmacologically and therapeutically acceptable, non-toxic acid addition salts, such as those with inorganic acids, for example, mineral acids, e.g., hydrochloric, hydrobromic, sulfuric, phosphoric acids and the like, or those with organic acids, such as organic carboxylic acids, e.g., acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicyclic, 4-aminosalicyclic, 2-phenoxybenzoic, 2-acetoxybenzoic acid and the like, or organic sulfonic acids, e.g., methane sulfonic, ethane sulfonic, 2-hydroxyethane sulfonic, p-toluene sulfonic acid and the like. Mono- or poly-salts may be formed.

The new compounds of this invention and the salts thereof cause in the anesthetized, normotensive dog an inhibition of the carotid occlusion reflex pressor responses and antagonize pressor responses elicited by high doses of pressure substances, such as amphetamine, and lower the arterial pressure in the unanesthetized renal or neurogenic hypertensive dog. These effects appear to be due to an inhibition of the release and/or distribution of transmitter substances from sympathetic nerve terminals. In view of these effects, the compounds of this invention can be used as antihypertensive agents to relieve hypertensive conditions, particularly those of neurogenic, renal or essential nature. In addition, compounds of this invention cause an increaset in peripheral blood flow and can, therefore, be used in functional peripheral vascular disesases, such as Raynaud's disease.

A preferred group of compounds of this invention may be represented by the compounds of the formula

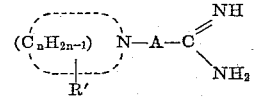

in which R' has the previously-given meaning, i.e., represents hydrogen or methyl, $n$ stands for one of the numbers 5, 6, 7 or 8, and A represents lower alkylene, which has preferably from two to three carbon atoms, and separates the amidino group from the n,n-alkylene-imino group by from two to three carbon atoms, or pharmacologically acceptable acid addition salts thereof, particularly those with suitable inorganic mineral acids. Specific members of this group are, for example, 2-(1-piperidino)-propionamidine, 3-(1-piperidino)-butyroamidine, 2-(1-N,N-hexamethylene-imino)-propionamidine, 3-(1-N,N-hexamethylene-imino)-butyroamidine, 2-[1-N,N-(3-methyl-hexamethylene)-imino]-propionamidine, 2-(1-N,N-heptamethylene-imino)-propionamidine, 2-[1-N,N-(4-methyl-heptamethylene)-imino]-propionamidine, 3-(1-N,N-heptamethylene-imino)-butyroamidine, 2-(1-N,N-octamethylene-imino)-propionamidine and the like, and pharmacologically acceptable acid addition salts thereof, particularly with suitable mineral acid.

The compounds of this invention may be used in the form of pharmaceutical preparations, which contain the new compounds in admixture with a pharmaceutical organic or inorganic, solid or liquid carrier suitable for enteral or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in the solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other pharmacologically useful substances.

The compounds of this invention may be prepared according to known methods. Generally, they are manufactured by converting in an R-lower alkano-nitrile or in a reactive, functionally converted derivative of such R-lower alkano-nitrile, in which R has the previously-given meaning, or a salt thereof, the nitrile group or the reactive, functionally converted nitrile group, respectively, into an amidino group, and, if desired, replacing in a resulting compound a hydrogen attached to a nitrogen atom of the amidino group by an aliphatic radical, and/or, if desired, converting a resulting salt into the free base, and/or, if desired, converting a resulting compound into a salt or into an acyl derivative thereof.

Reactive, functionally converted derivatives of the R-lower alkano-nitriles are represented, for example, by R-lower alkano-amidoximes, lower alkyl R-lower alkano-imidates or lower alkyl R-lower alkano-thioimidates, R-lower alkane thiocarboxylic acid amides, in which R has the previously-given meaning, or any other analogous compound derived from a nitrile. Conversion of the nitriles or the reactive, functionally converted derivatives thereof into the desired amidines is carried out according to known methods, which depend largely on the nature of the group to be converted.

Thus, the compounds of this invention may be prepared by treating an R-lower alkano-amidoxime, in which R has the previously-given meaning, or a salt thereof, with a reducing reagent, and, if desired, carrying out the optional steps.

The above procedure is preferably carried out by treating the starting material with catalytically activated hydrogen using a metal catalyst containing a metal of the eighth group of the periodic system, for example, rhodium and the like. Rhodium on aluminum oxide represents the preferred catalyst. Treatment with hydrogen may be carried out under atmospheric pressure or under increased pressure, at room temperature or at an elevated temperature, preferably while shaking.

The starting materials used in the above procedure are known or may be prepared according to known methods, for example, by reacting an R-lower alkano-nitrile with a salt, e.g., hydrochloride and the like, of a hydroxylamine, preferably in the presence of a suitable base, such as an alkali metal lower alkanolate, e.g., potassium methanolate, sodium ethanolate and the like.

The compounds of this invention may also be obtained by reacting a lower alkyl R-lower alkano-imidate or a lower alkyl R-lower alkano-thioimidate, in which R has the previously-given meaning, or a salt thereof, with ammonia or an amine or a salt of such reagents, and, if desired, carrying out the optional steps.

Treatment with ammonia or an amine or a salt of such reagents is carried out according to known methods; liquid ammonia or, more preferably, aqueous ammonia or ammonia in an inert organic solvent, such as a lower alkanol, e.g., methanol, ethanol and the like, may be used. The reaction takes place while cooling, at room temperature or at an elevated temperature, if necessary, in a closed vessel and/or in the atmosphere of nitrogen.

The starting materials used in the above procedure may be prepared according to known methods, for example, by treating an R-lower alkano-nitrile with a lower alkanol, e.g., methanol, ethanol and the like, or a lower alkyl-mercaptan, e.g., methylmercaptan, ethylmercaptan and the like, in the presence of an acid, preferably a gaseous acid, e.g., hydrogen chloride and the like.

The above starting materials, i.e., the lower alkyl R-lower alkano-imidates and lower alkyl R-lower alkano-thioimidates, or salts thereof, are new and are intended to be included within the scope of this invention. Particularly useful are the compounds of the formulae

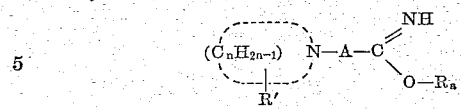

and

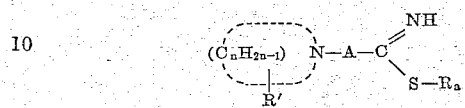

in which R' represents hydrogen or methyl, $R_a$ stands for lower alkyl, e.g., methyl, ethyl, n-propyl, isopropyl, n-butyl and the like, $n$ stands for one of the numbers 5, 6, 7, 8, and A, representing lower alkylene with from two to three carbon atoms, separates the lower alkyl imidate and the lower alkyl thioimidate grouping, respectively, from the N,N-alkylene-imino group by from two to three carbon atoms, or acid addition, particularly mineral acid addition, salts thereof.

The compounds of this invention may also be prepared by reacting an R-lower alkane thiocarboxylic acid amide with ammonia or an amine, and, if desired, carrying out the optional steps.

The above reaction is carried out according to known methods, for example, by treating the starting material with concentrated aqueous ammonia, preferably in the presence of a reagent capable of forming insoluble sulfides, e.g. mercuric chloride. The starting materials are prepared according to known methods.

The compounds of this invention may also be manufactured from the nitriles themselves, for example, by reacting an R-lower alkano-nitrile with a metal amide, and, if desired, carrying out the optional steps.

The above treatment of the nitrile starting material with a metal amide, such as an alkali metal amide, e.g. sodium amide, potassium amide and the like, or an alkaline earth metal amide, e.g., calcium amide and the like, is carried out in an inert, anhydrous medium, e.g., benzene, toluene, xylene, anisole and the like, or in liquid ammonia, or any other suitable diluent. A resulting metal salt of the desired amidine is converted into the free compound by hydrolysis with water at a low temperature or with an anhydrous solution of an acid, e.g., hydrogen chloride and the like, for example, in a lower alkanol, e.g., ethanol and the like; the latter treatment affords the formation of an acid addition salt. The nitriles used as the starting materials are known or may be prepared according to the methods used to manufacture the known ones.

The nitriles may also be converted into amidines of this invention by treating an R-lower alkano-nitrile with ammonium chloride, and, if desired, carrying out the optional steps.

The above-described treatment with ammonium chloride is preferably carried out in the presence of liquid ammonia, if necessary, in a closed vessel.

A hydrogen attached to one of the nitrogen atoms of the amidino group in resulting compounds may be replaced by an organic, such as an aliphatic, radical, particularly by lower alkyl, according to known methods, for example, by treatment with a reactive ester of an alcohol, such as an aliphatic alcohol, particularly a lower alkanol. Such esters are primarily those formed by the alcohols, such as the lower alkanols, with strong inorganic acids, e.g., hydrochloric, hydrobromic, hydriodic, sulfuric acid and the like, or strong organic sulfonic acids, e.g., p-toluene sulfonic acid and the like, and are represented primarily by aliphatic halides, particularly lower alkyl halides, e.g., methyl, ethyl, n-propyl, isopropyl chloride, bromide or iodide and the like, di-lower alkyl sulfates, e.g., dimethyl sulfate, diethyl sulfate and the like, or any other suitably esterified aliphatic alcohol. Treatment of the amidine compound with the reactive ester compound is preferably carried out at an elevated temperature, if necessary, in a closed vessel under pressure.

Depending on the conditions used, the compounds of this invention are obtained in the form of the free bases or the salts thereof. A salt may be converted into the free base, for example, by reacting it with an alkaline reagent, for example, with an alkali metal hydroxide, e.g., lithium hydroxide, sodium hydroxide, potassium hydroxide and the like, or any other suitable reagent, particularly an anion (hydroxyl) exchange resin. A free base may be converted into its therapeutically useful acid addition salts by reaction with one of the inorganic or organic acids described hereinbefore, for example, by treating a solution of the base in an inert solvent or solvent mixture with the acid or a solution thereof.

Acylation of the resulting amidine compounds may be carried out, for example, by treatment with the reactive derivative of a carboxylic acid, for example, with the halide, e.g., chloride and the like, or the anhydride thereof. It may be performed in the presence of an inert solvent, for example, in a hydrocarbon, such as a lower alkane, e.g., pentane, hexane and the like, or a monocyclic carbocyclic aryl hydrocarbon, e.g., benzene, toluene, xylene and the like, or in a tertiary organic base, such as a liquid pyridine compound, e.g., pyridine, collidine and the like. Acylation may also be achieved in the absence of a solvent, for example, by heating the amidine compound or a salt thereof with the acylating reagent, for example, acetic acid anhydride in a sealed tube.

The invention also comprises any modification of the process wherein a compound obtainable as an intermediate at any stage of the process is used as starting material ond the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

Example 1

A mixture of 18.5 g. of 3-(1-N,N-hexamethylene-imino)-propionamidoxime and 5 g. of rhodium on aluminum oxide in 100 ml. of anhydrous ethanol is treated at room temperature with hydrogen under a pressure of about 3½ atmospheres while shaking. The calculated amount of hydrogen is absorbed in five hours; the reaction mixture is filtered directly into a cooled solution of hydrogen bromide in ethanol, and the crystalline precipitate is filtered off. The desired 3-(1-N,N-hexamethylene-imino)-propionamide dihydrobromide of the formula

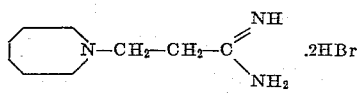

is purified by recrystallization from a mixture of ethanol and hexane and melts at 164–166°.

The starting material used in the above reaction may be prepared as follows: 50 g. of N,N-hexamethylene-imine is slowly added to 212 g. of acrylonitrile with stirring. During the addition the reaction mixture warms up; benzyl-trimethyl-ammonium hydroxide (as a 38 percent aqueous solution) is added after the initial reaction subsides, and the mixture is refluxed for about 1½ hours. Stirring is continued overnight at room temperature; the excess acrylonitrile is removed under reduced pressure and the residual liquid is fractionated to give 3-(1-N,N-hexamethylene-imino)-propionitrile, B.P. 121–123° C./14 mm., $n_D^{30} = 1.4710$.

30.4 g. of 3-(1-N,N-hexamethylene-imino)-propionitrile is added to a solution of about 13.9 g. of hydroxylamine hydrochloride in 300 ml. of anhydrous ethanol. A solution of sodium ethylate containing 4.6 g. of sodium in 150 ml. of anhydrous ethanol is slowly added to the mixture with stirring. After the addition is completed, the reaction mixture is refluxed for 3 hours and allowed to stand at room temperature for 72 hours. Solid material is filtered from the reaction mixture, and the filtrate concentrated under reduced pressure to give a pale yellow oil of 3-(1-N,N-hexamethylene-imino)-propionamidoxime. The dihydrochloride of this product is formed by dissolving the oil in anhydrous ethanol, gassing with dry hydrogen chloride and adding ether. The crystalline 3-(1-N,N-hexamethylene-imino)-propionamidoxime dihydrochloride precipitates and is recrystallized from ethanol, M.P. 183–185° (decomposition). The salt is converted into the free base by dissolving the former in a small amount of water, adding a 40 percent aqueous solution of sodium hydroxide and extracting the organic material with chloroform. The chloroform is evaporated and the residue is recrystallized from xylene to yield the 3-(1-N,N-hexamethylene-imino)-propionamidoxime, M.P. 80–82°.

Other compounds, such as the 2-(1-N,N-hexamethylene-imino)-acetoamidine, 3-(1 - piperidino)-propionamidine, 3-(1 - N,N-heptamethylene-imino)-propionamidine are prepared according to the above procedure or any of the previously-described methods.

Example 2

To a cold 10 percent solution of anhydrous ammonia in anhydrous ethanol is added 14.75 g. of ethyl 3-(1-N,N-hexamethylene - imino) - propiothioimidate dihydrobromide. The mixture is shaken at room temperature for 48 hours, and is then diluted with hexane. The resulting precipitate is filtered off and recrystallized from a mixture of ethanol and hexane to yield 3-(1-N,N-hexamethylene-imino)-propionamidine dihydrobromide, which is identical with the compound obtained according to the procedure descrbed in Example 1.

The starting material may be prepared as follows: Through a cold mixture of 15.2 g. of 3-(1-N,N-hexamethylene-imino)-propionitrile and 7.0 g. of ethylmercaptan in 145 ml. of chloroform is passed gaseous hydrogen bromide for thirty minutes while stirring occasionally. The resulting solution is allowed to stand overnight in the cold, the white precipitate is filtered off and purified by dissolving it in chloroform and precipitating it with hexane. The desired ethyl 3 - (1 - N,N-hexamethylene-imino)-propiothioimidate dihydrobromide of the formula

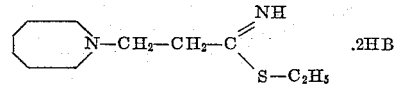

melts at 152–154°.

Example 3

An aqueous solution of ethyl 3-(1-N,N-hexamethylene-imino)-propiothioimidate dihydrobromide is neutralized with a five percent aqueous solution of sodium hydrogen carbonate; the free base is then extracted with chloroform, and the organic solution is concentrated under reduced pressure. The residue is dissolved in 30 ml. of ethanol, which is treated with one molar equivalent of ammonium bromide in 8 ml. of water and heated at 60° for three hours. The solution is concentrated, the residue is cooled and hexane is added. The desired 3-(1-N,N-hexamethylene-imino)-propionamidine dihydrobromide separates and is recrystallized from a mixture of ethanol and hexane, M.P. 164–166°.

Example 4

A mixture of 11.5 g. of 3-(1-piperidino)-propionamidoxime (prepared from the dihydrochloride as shown in Example 1, M.P. 140–142° after recrystallization from xylene) and 3.38 g. of a rhodium catalyst (rhodium on aluminum oxide, 5 percent) in 150 ml. of anhydrous ethanol is treated with hydrogen under a pressure of about 3½ atmospheres, and the desired 3-(1-piperidino)-propionamidine dihydrobromide of the formula

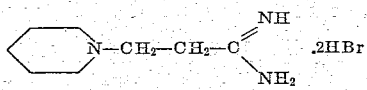

is isolated as described in Example 1; it is purified by recrystallization from a mixture of ethanol and hexane, M.P. 169–170°.

*Example 5*

A mixture of 19.9 g. of the oily 3-(1-N,N-heptamethylene-imino)-propionamidoxime (prepared from the dihydrochloride according to the method shown in Example 1) and 5 g. of the rhodium catalyst in 100 ml. of ethanol is treated with hydrogen as described in Example 1; the desired 3-(1-N,N-heptamethylene-imino)-propionamidine is isolated as the dihydrobromide of the formula

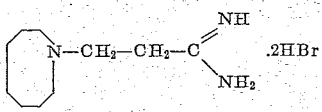

and melts at 176–178° after recrystallization from a mixture of ethanol and diethyl ether.

*Example 6*

A mixture of 13.0 g. of 2-(1-N,N-hexamethylene-imino)-acetamidoxime in 200 ml. of anhydrous ethanol and 6.0 g. of a rhodium catalyst (6 percent rhodium on aluminum oxide) is treated with hydrogen under a pressure of about 3.1 atmospheres while shaking until the theoretical amount has been absorbed. The reaction mixture is directly filtered into a cold saturated solution of hydrogen bromide in ethanol, and the resulting 2-(1-N,N-hexamethylene-imino)-acetamidine dihydrobromide of the formula

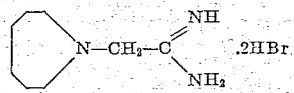

is filtered off and recrystallized from a mixture of hexane and ethanol, and from ethanol, M.P. 186–188°; yield: 9.5 g.

*Example 7*

A mixture of 10.0 g. of 4-(1-N,N-hexamethylene-imino)-butyroamidoxime in 100 ml. of absolute ethanol and 5.0 g. of a rhodium catalyst (5 percent rhodium on aluminum oxide) is treated with hydrogen at a pressure of 3.1 atmospheres while shaking. After the uptake of the theoretical amount of hydrogen, the reaction mixture is directly filtered into a saturated solution of hydrogen bromide in dry ethanol. The resulting precipitate is filtered off and recrystallized from a mixture of ethanol and hexane to yield 7.0 g. of 4-(1-N,N-hexamethylene-imino)-butyroamidine dihydrobromide of the formula

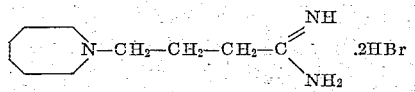

which melts at 142–144°.

The starting material used in the above procedure is prepared as follows: To a refluxing solution of 52.5 g. of N,N-hexamethylene-imine in 125 ml. of benzene is added 40.0 g. of 4-bromobutyronitrile in 60 ml. of benzene while stirring. Refluxing is continued for an additional five hours; the reaction mixture is filtered and the filtrate is concentrated under reduced pressure to yield the 4-(1-N,N-hexamethylene-imino)-butyronitrile, which is purified by distillation and collected at 129–130°/15 mm.; yield: 36.2 g.

To a solution of 12.66 g. of hydroxylamine hydrochloride in 450 ml. of ethanol is added 36.2 g. of the 4-(1-N,N-hexamethylene-imino)-butyronitrile and then a solution of 4.22 g. of sodium in 250 ml. of ethanol. The reaction mixture is refluxed for three hours, and is then allowed to stand overnight and concentrated under reduced pressure. On cooling, the desired 4-(1-N,N-hexamethylene-imino)-butyroamidoxime solidifies and is recrystallized from a mixture of hexane and ethanol, M.P. 87–89°; yield: 11.4 g.

What is claimed is:

1. An N,N-alkylene-imino-lower alkano-amidine of the formula

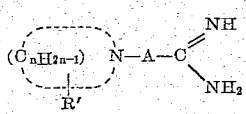

in which R′ is a member selected from the group consisting of hydrogen and methyl, $n$ stands for an integer selected from the group consisting of 5, 6, 7 and 8, and A is lower alkylene.

2. A pharmacologically acceptable, non-toxic acid addition salt of an N,N-alkylene-imino-lower alkano-amidine of the formula

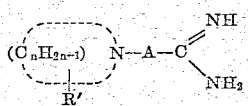

in which R′ is a member selected from the group consisting of hydrogen and methyl, $n$ stands for an integer selected from the group consisting of 5, 6, 7 and 8, and A is lower alkylene.

3. 3-(1-N,N-hexamethylene-imino)-propionamidine.

4. A pharmacologically acceptable, non-toxic acid addition salt of 3-(1-N,N-hexamethylene-imino)-propionamidine.

5. 3-(1-N,N-hexamethylene-imino)-propionamidine dihydrobromide.

6. 3-(1-N,N-heptamethylene-imino)-propionamidine.

7. A pharmacologically acceptable acid addition salt of 3-(1-N,N-heptamethylene-imino)-propionamidine.

8. 3-(1-N,N-heptamethylene-imino) - propionamidine dihydrobromide.

References Cited by the Examiner

UNITED STATES PATENTS

| | | | |
|---|---|---|---|
| 2,375,611 | 5/45 | Barber et al. | 260—293 |
| 2,897,195 | 7/59 | Mull | 260—293 |
| 2,928,829 | 3/60 | Mull | 260—293 |
| 2,947,782 | 8/60 | De Benneville et al. | 260—293 |

IRVING MARCUS, *Primary Examiner.*

NICHOLAS S. RIZZO, WALTER A. MODANCE,
*Examiners.*